United States Patent
Herkommer et al.

(10) Patent No.: US 10,151,391 B2
(45) Date of Patent: Dec. 11, 2018

(54) ACTUATION DEVICE FOR A MOTOR VEHICLE

(71) Applicant: Schaeffler Technologies AG & Co. KG, Herzogenaurach (DE)

(72) Inventors: Dominik Herkommer, Schriesheim (DE); Dirk Reimnitz, Buehl (DE); Peter Greb, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 299 days.

(21) Appl. No.: 14/769,271

(22) PCT Filed: Feb. 3, 2014

(86) PCT No.: PCT/DE2014/200039
§ 371 (c)(1),
(2) Date: Aug. 20, 2015

(87) PCT Pub. No.: WO2014/131411
PCT Pub. Date: Sep. 4, 2014

(65) Prior Publication Data
US 2015/0377352 A1    Dec. 31, 2015

(30) Foreign Application Priority Data
Feb. 27, 2013   (DE) .................. 10 2013 203 284

(51) Int. Cl.
*F16H 63/30* (2006.01)
*F16H 63/20* (2006.01)
(Continued)

(52) U.S. Cl.
CPC ............. *F16H 63/30* (2013.01); *F16H 63/20* (2013.01); *F16H 63/36* (2013.01);
(Continued)

(58) Field of Classification Search
CPC .......... F16H 63/20; F16H 63/30; F16H 63/36; F16H 2063/025; F16H 2063/202; F16H 2063/3086
(Continued)

(56) References Cited

U.S. PATENT DOCUMENTS 2,893,256 A * 7/1959 Wargo ............... F16H 63/304
192/48.91
3,370,477 A * 2/1968 Lewis .................. F16H 63/18
74/337.5

(Continued)

FOREIGN PATENT DOCUMENTS

AU     4927990     8/1990
CN     1580614     2/2005
(Continued)

*Primary Examiner* — William C Joyce
(74) *Attorney, Agent, or Firm* — Simpson & Simpson, PLLC

(57) ABSTRACT

An actuation device for a motor vehicle having a transmission with gear steps and a friction clutch for automated actuation of both the transmission and the friction clutch, where the actuation device has an actuator device with whose help both a rotational movement and a translational movement is executable, in order to improve the actuation device in terms of construction and/or function.

8 Claims, 6 Drawing Sheets

(51) Int. Cl.
*F16H 63/36* (2006.01)
*F16H 63/02* (2006.01)

(52) U.S. Cl.
CPC .. *F16H 2063/025* (2013.01); *F16H 2063/202* (2013.01); *F16H 2063/3086* (2013.01)

(58) Field of Classification Search
USPC .................................. 74/333, 473.12, 473.24
See application file for complete search history.

(56) References Cited

U.S. PATENT DOCUMENTS

| | | | | |
|---|---|---|---|---|
| 5,219,391 | A * | 6/1993 | Edelen | F16H 61/32 74/335 |
| 5,689,997 | A * | 11/1997 | Schaller | F16H 61/32 74/335 |
| 5,724,856 | A * | 3/1998 | Back | F16H 61/28 74/335 |
| 6,173,624 | B1 * | 1/2001 | Decker | F16H 63/18 475/269 |
| 7,240,577 | B2 * | 7/2007 | Choi | F16H 63/18 74/335 |
| 8,365,627 | B2 * | 2/2013 | Kim | F16H 61/32 74/330 |
| 2005/0040783 | A1 * | 2/2005 | Hemphill | F16H 61/32 318/468 |
| 2011/0023649 | A1 | 2/2011 | Kim et al. | |

FOREIGN PATENT DOCUMENTS

| | | |
|---|---|---|
| CN | 101497315 | 8/2009 |
| CN | 102803798 | 11/2012 |
| DE | 102004038955 | 3/2005 |
| EP | 1508727 | 2/2005 |
| EP | 1632695 | 3/2006 |
| EP | 2196707 | 6/2010 |
| WO | 2002/066870 | 8/2002 |

* cited by examiner

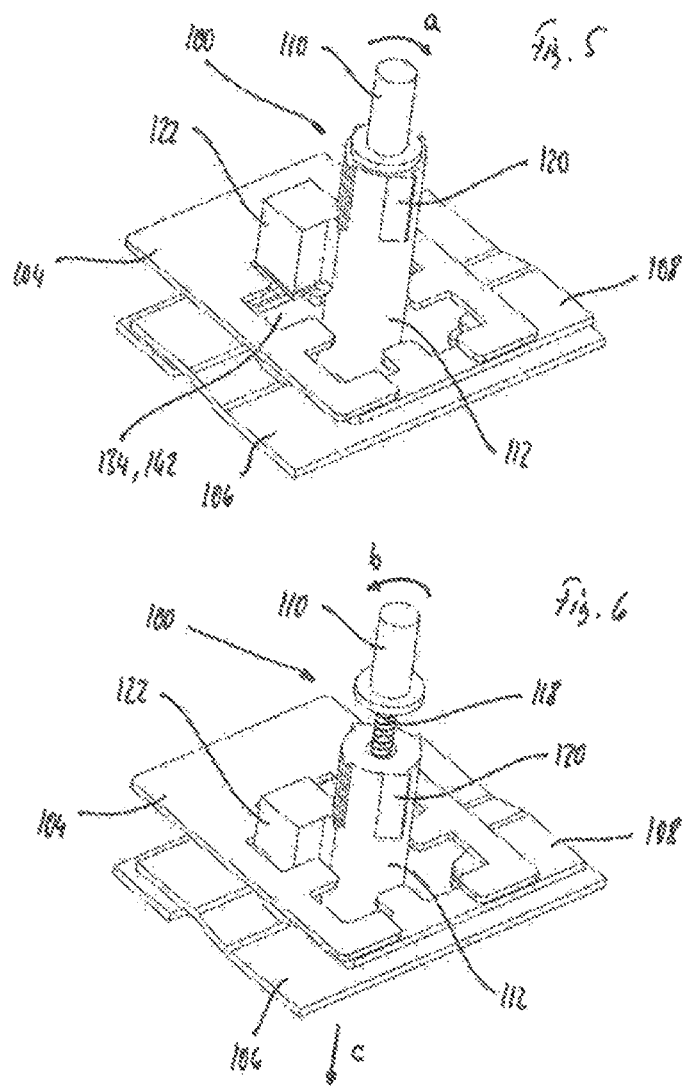

ACTUATION DEVICE FOR A MOTOR VEHICLE

CROSS-REFERENCE TO RELATED APPLICATIONS

The present application is the U.S. national stage application pursuant to 35 U.S.C. § 371 of International Application No. PCT/DE2014/200039, filed Feb. 3, 2014, which application claims priority from German Patent Application No. DE 10 2013 203 284.6, filed Feb. 27, 2013, which applications are incorporated herein by reference in their entireties.

TECHNICAL FIELD

The invention relates to an actuation device for a motor vehicle having a transmission with gear steps and a friction clutch, for automated actuation of both the transmission and the friction clutch.

BACKGROUND

From WO 02/066870 A1 a transmission is known, in particular for motor vehicles, which has a plurality of wheel sets that form gear steps, each of which is made up of a speed-change gear wheel that is firmly connected to a shaft and an idler gear that can be connected to a shaft, where gear steps are engaged by connecting an idler gear with the shaft that carries it by means of a final output element which is part of a final output mechanism, which is actuated by the final actuating mechanism, and where the shifting sequence of the gear steps is not fixed in the final actuating mechanism, in order to produce a transmission—for example an automated shift transmission, a power-shift transmission, a dual-clutch transmission having gear steps distributed between at least two different shafts, and the like—in which the shifting sequence of the gear steps is not fixed in the final actuating mechanism, in which the shifting times are shortened significantly, which is a substantial improvement in terms of safety.

From DE 10 2004 038 955 A1 an actuation device is known for acting upon at least two shifting elements which are spaced apart from each other, each having at least one first engagement zone for actuation thereof, having the following features: a drive shaft is drivable by a motor in both directions of rotation; the drive shaft has a first thread profile; on the first thread profile of the drive shaft a setting device is rotationally accommodated by means of a second thread profile which is complementary to the first thread profile; a control element which is non-rotatably connected to the setting device causes the setting device to rotate along with the drive shaft when the drive shaft rotates in a first direction of rotation, while at least one second engagement zone provided on the setting device is positioned on at least one engagement zone of at least one shifting element; when the drive shaft is rotated in a second direction of rotation, contrary to the first direction of rotation, the control element controls an axial displacement of the setting device relative to the drive shaft, and thus an actuation of the at least one shifting element, on whose first engagement zone the second engagement zone is positioned. This creates an actuation device which can be produced inexpensively, which operates reliably while requiring little effort to construct.

SUMMARY

According to aspects illustrated herein, there is provided an actuation device for a motor vehicle having a transmission with gear steps and a friction clutch, the actuation device having an actuator device configured to enable a rotational movement and a translational movement, and configured to enable automated actuation of both the transmission and the friction clutch.

A general object of the invention is to improve the construction and/or function of an actuation device. In particular, the actuation device is to be simplified. In particular, a production expense is to be reduced. In particular, a construction space requirement is to be reduced.

In an example embodiment, an actuation device for a motor vehicle is provided as having a transmission with gear steps and a friction clutch for automated actuation of both the transmission and the friction clutch, where the actuation device has an actuator device with whose help both a rotational movement and a translational movement are executable.

The motor vehicle may have a drivetrain. The drivetrain may have an internal combustion engine. The drivetrain may have a torsional vibration damper. The drivetrain may have the transmission. The transmission may be a multistep transmission. The transmission may be a shift transmission. The transmission may have shifting elements to shift the transmission steps. The shifting elements may have claw clutches with sliding muff-type couplings. Gear steps of the transmission may be power-shiftable. The transmission may have at least one subtransmission. The transmission may have a single subtransmission. The transmission may have a first subtransmission and a second subtransmission. The transmission may have at least one input shaft. The transmission may have a single input shaft. The transmission may have a first input shaft and a second input shaft. The transmission may have an input shaft for each subtransmission. The drivetrain may have a friction clutch device. The friction clutch device may have at least one friction clutch. The friction clutch device may have a single friction clutch. The friction clutch device may have a first friction clutch and a second friction clutch. The friction clutch device may have a friction clutch for each subtransmission. The friction clutch device may have a friction clutch for each input shaft of the transmission. A friction clutch can serve to shift a mechanical power stream between the internal combustion engine and an input shaft with modulation, in order to enable driving off and changing gear steps. A friction clutch can serve to shift a mechanical power stream between the internal combustion engine and the first input shaft or the second input shaft in a transitional change with modulation, in order to enable power shifting.

Automated actuation can occur with the help of a control device which is able to issue output signals to control the actuator device on the basis of input signals. The actuator device may have an axis. The actuator device may have a rotation axis. The actuator device may have a translation axis. The actuator device may have a combined rotation and translation axis.

When the transmission is actuated, first a gear step which is to be engaged can be selected and then the selected gear step engaged, where a selection movement can be executed with the help of the rotational movement and an engagement movement can be executed with the help of the translational movement of the actuator device. An actuation of the friction clutch can be executable with the help of the translational movement of the actuator device.

The actuation device may have an active shift lock, which can serve to disengage a previously engaged gear step when engaging a gear step. The active shift lock can also be referred to as "active interlock." The actuation device may have a first contour section for engaging a gear step. The actuation device may have at least one second contour section for disengaging a gear step. (Information: the disengagement occurs during the translational motion prior to the engagement). The first contour section and the at least one second contour section may be firmly assigned to each other. The first contour section and the at least one second contour section may be constructionally combined. Contour sections may also be used for both the disengaging and the engaging; preferably these contour sections then enter one after the other into operative connection with various opposing contours, in order to fulfill the particular function. The actuation device may have a shift lock, which can serve to secure an actuation state of the transmission during an actuation of the friction clutch. This shift lock and the active shift lock may be constructionally combined.

During an actuation, the actuator device may first actuate the transmission and then the friction clutch. The actuator device may have a drive, whereby an actuation of the transmission and the friction clutch one after the other can be accomplished with the help of a continuous drive motion. A continuous drive motion may be a drive motion without a change of direction.

The actuator device may have a rotary drive, a spindle drive and a rotationally and translationally movable tappet. The rotary drive may be an electric motor. The rotary drive may have a stator and a rotor. The spindle drive may have a spindle screw and a spindle nut. The spindle screw may be non-rotatably situated on the rotary drive. The spindle nut may be non-rotatably situated on the tappet. The spindle screw and the spindle nut may be rotatable relative to each other. Turning the spindle screw may cause a translational movement of the spindle nut between a first end position and a second end position, when the spindle nut is prevented from rotating. In the first end position the spindle nut may stop on the rotary drive side, so that rotation between the spindle screw and the spindle nut is prevented. In the first end position, the spindle screw and the spindle nut may be rotatable together. The tappet may have essentially the form of a round cylinder. Alternatively, the assignments of spindle screw and spindle nut may also be exchanged. If the spindle nut is non-rotatably connected to the rotary drive and the spindle screw to the tappet, the same functions can be fulfilled correspondingly as described above. The rotary drive may be driven, for example, electrically, hydraulically or pneumatically.

The actuation device may have a tappet with a transmission actuating section and a clutch actuating section, a fixed perforated mask, and at least one movable gear track.

The tappet may have a first end on the rotary drive side and an opposite second end. The tappet may have catch sections. The catch sections may serve to prevent rotation of the tappet, and therefore of the spindle nut, in defined positions. The defined positions may serve to select gear steps which are subsequently to be engaged. The defined positions may serve to provide rough rotary adjustment of the tappet. The catch sections may be situated at the first end of the tappet. The catch sections may be designed as catch tabs. The transmission actuating section may be situated eccentrically on the tappet. The transmission actuating section may be formed on the tappet as a radial projection. During a rotary movement of the tappet, the transmission actuating section may be movable in the circumferential direction of the tappet. The transmission actuating section may have a square cross section. The transmission actuating section may have a first end on the rotary drive side and an opposite second end. The transmission actuating section may have a ramp profile to move the at least one gear track. The ramp profile may be situated at the second end of the tappet. The ramp profile may be pyramid-shaped. The ramp profile may have a point. The clutch actuating section may be situated at the end of the tappet. The clutch actuating section may be situated at the second end of the tappet. The clutch actuating section may be designed as a thrust bolt. The clutch may also be actuated via the transmission actuating section. For example by the pyramid-shaped end of the transmission actuating section striking a contact surface after the gear step is engaged, which contact surface is moved by the transmission actuating section (for example, parallel or perpendicular to the direction of movement of the tappet) and interacts operatively with the clutch. If the end of the transmission actuating section is provided with a truncated pyramid contour instead of a pointed pyramid contour, it is possible to integrate both ramps for disengaging and engaging the gear steps and a flat tappet surface for actuating the clutch.

The perforated mask may have groove-like recesses. The perforated mask may have a flat shape. The recesses may correspond geometrically complementarily to the cross section of the transmission actuating section. The perforated mask may have a recess for each gear step. The perforated mask may serve to positively guide a translational movement of the tappet. The perforated mask may serve for rotational fine adjustment of the tappet. The perforated mask may serve to prevent or limit a translational motion of the tappet and of the clutch actuating section, if the clutch actuating section is not aligned sufficiently precisely with one of the recesses present in the perforated mask and assigned to engaging a gear step.

The at least one gear step may have a flat shape. The at least one gear track can be kinematically connected to a shifting element of the transmission. Moving the at least one gear track can cause a shifting of a shifting element of the transmission. The at least one gear track may have edge sections. The edge sections may be inner edge sections. The at least one gear track may have at least one edge section for engaging a gear step. The at least one gear track may have at least one edge section for disengaging a gear step. The edge sections may correspond to the transmission actuating section. The edge sections may correspond to the ramp profile of the transmission actuating section. A translational movement of the tappet may cause a displacement of the at least one gear trap.

In summary, and described in other words, the invention yields, among other things, a single-motor transmission actuator with active interlock. A single-motor actuating system with active interlock can be provided. A constructive design may be characterized by the following points: combined transmission and clutch actuator with one motor—selecting and actuating with the same motor; switching from selecting to actuating by changing the direction of the motor; active interlock, which guarantees that only one gear is engaged; engaged gears are always disengaged before a new gear is engaged; engaged gear and disengaged gears are mechanically secured during a clutch actuation; actuation of a clutch in every gear position by continuing to operate the actuator; disengagement of an old gear, engagement of a new gear and actuation of the clutch take place in one continuous motion without changing the direction of the motor.

The actuating system may have a tappet. The tappet may be used to disengage and engage gears, as well as to actuate the clutch. A spindle drive may be situated in the interior of the tappet. The tappet may be moved translationally by means of this spindle drive. The tappet may bottom out, so that it rotates together with the spindle. A gear selector may be attached to a main body of the tappet. The latter may have a pyramid-shaped point. At one end of the tappet there may be a locking contour (ratchet), for example having elevations or indentations which may be engaged by a locking pawl. Thus the locking pawl can slip past in one direction to select the desired position, and when actuated in the other direction can block so that the tappet stops in a correct orientation. If the rotary motion of the tappet is blocked by the locking pawl, then the tappet can be moved translationally downward by means of the spindle drive. During the downward movement, a perforated mask can assume the function of the locking pawl, and specify the rotational position of the tappet. As it moves further, sloping surfaces of the pyramid of the tappet can disengage or engage the gears. By moving it further, the clutch can be actuated. At the same time, the selected gear can remain secured, and the gears on a different track can be held securely in the disengaged position.

The actuating system may have a spindle with a drive. The spindle may be driven by a motor. A block (limit stop) may be situated at the end of the spindle. When this block is reached by the tappet, the tappet may rotate together with the spindle.

The actuating system may have a perforated mask. The perforated mask may guarantee rotational fixing of the gear selector by means of grooves. The gear selector may be fixed in four positions, which correspond to four gears of a subtransmission. By fixing the gear selector in the perforated mask, the load on the locking pawl can be relieved, and the tappet can be prevented from turning while retracting before the gear selector has retracted completely. The gear selector can be advanced far enough so that even with the maximum translational movement it only dips into the perforated mask, but does not plunge through it. This enables the rotational fixing of the gear selector to be ensured over a long range of motion. To improve the guidance, the perforated mask may also have guide elements or be augmented with other guide elements, which extend in the direction of motion of the gear selector. These guide elements of the perforated mask and the lateral surfaces of the gear selector preferably have flat, parallel contact areas.

The actuating system may have gear tracks. The gear tracks may be connected to shifting elements (sliding muff-type couplings) in the transmission. Grooves may be cut in the gear tracks in such a way that in the appropriate position the bevels of the gear selector can shift the gears. The gear tracks here may be so encapsulated, one over the other, that on one side—viewed from the top, from the perspective of the tappet—lie the disengaging grooves with which the gear is disengaged, when a gear on the other side (located beneath) is to be engaged. On the other side, the grooves for engaging the gear can be located under the disengaging grooves of the other track. This enables the former gear of this track to be disengaged, and the new gear engaged in the same motion.

The actuation device according to the invention is simplified. A production expense is reduced. A construction space requirement is reduced.

BRIEF DESCRIPTION OF THE DRAWINGS

Exemplary embodiments of the invention will be described in greater detail below in reference to figures. Additional features and benefits result from this description. Concrete features of these exemplary embodiments may depict general features of the invention. Features of these exemplary embodiments combined with other features may also represent individual features of the invention.

The figures show the following, schematically and by way of example:

FIG. 5 illustrates the actuation device after executing a selection movement;

FIG. 6 illustrates the actuation device while engaging a gear step;

DETAILED DESCRIPTION

Figure 1:
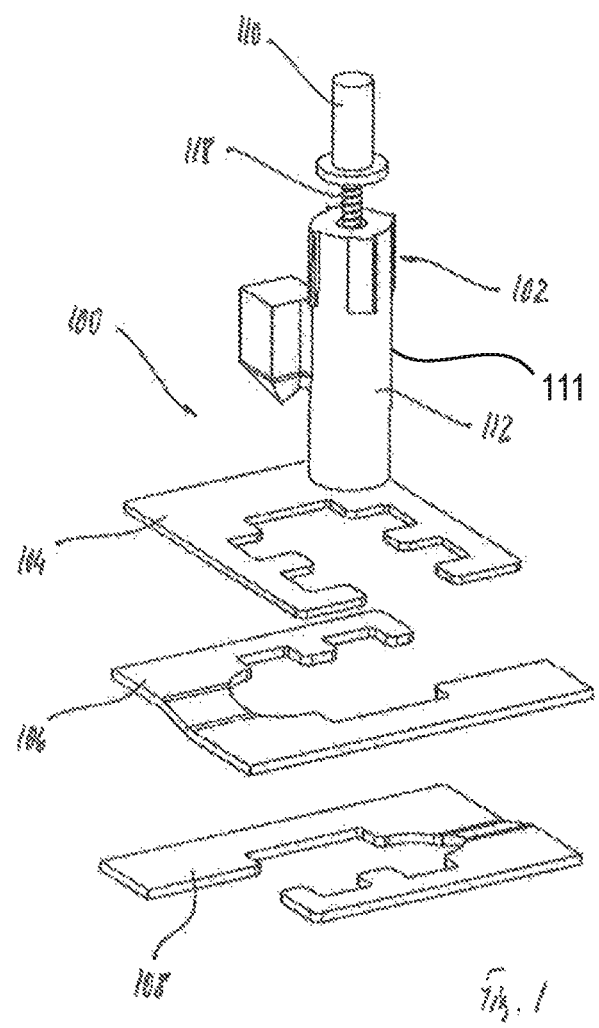
FIG. 1 is an exploded view of an actuation device for actuating both a transmission and a friction clutch, having an actuator device, a perforated mask and two gear tracks.

At the outset, it should be appreciated that like reference characters on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

"Can" or "may" designate in particular optional features of the invention. Accordingly, in each case there is one exemplary embodiment of the invention which has the particular feature or particular features.

By "non-rotatably connected" first and second components we mean that the first component is connected to the second component so that any time the first component rotates, the second component rotates with the first component, and any time the second component rotates, the first component rotates with the second component. Axial displacement between the first and second components is possible.

Figure 3:
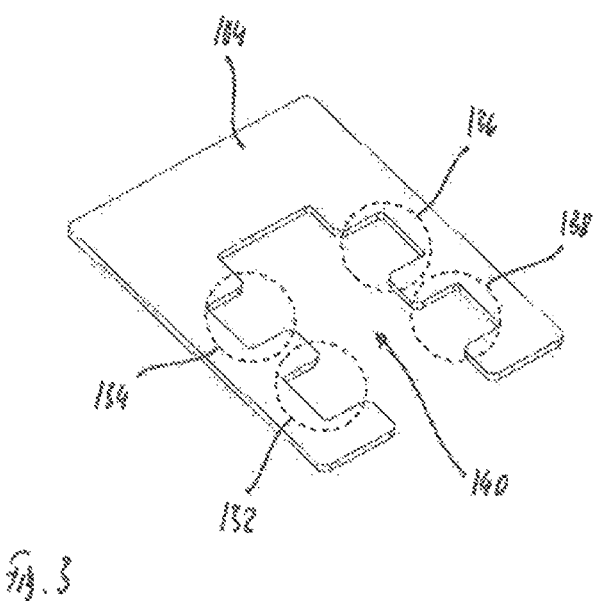
FIG. 3 is a detail view of the perforated mask of the actuation device.
Figure 4:
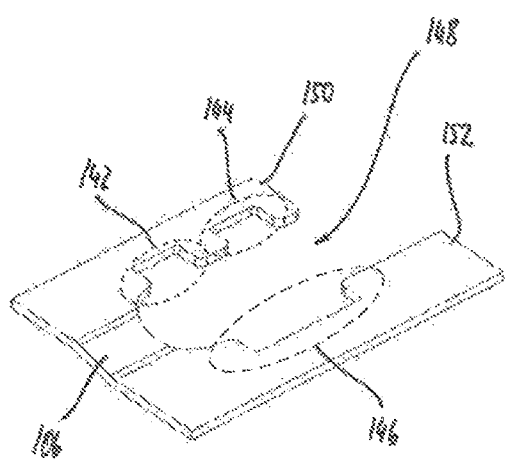
FIG. 4 is a detail view of a gear track of the actuation device.

FIG. 1 shows actuation device 100 for actuating both a transmission and a friction clutch, having actuator device 102, perforated mask 104 and two gear tracks 106, 108, in an exploded view. Actuator device 102 further comprises radially outward facing surface 111. FIG. 3 shows a detail view of perforated mask 104 of actuation device 100. FIG. 4 shows a detail view of gear track 106 of the actuation device 100. From the perspective of actuation device 100, perforated mask 104 is situated on top; gear tracks 106, 108 are situated underneath perforated mask 104.

Actuation device 100 serves to automatically actuate both the transmission and the friction clutch in a motor vehicle drivetrain which also has an internal combustion engine with an output shaft. The transmission is a multistep shifting transmission, with which gear steps can be shifted. To shift the gear steps, the transmission has shifting elements, such as claw clutches, having sliding muff-type couplings. The transmission has an input shaft. The friction clutch is situated in the drivetrain between the internal combustion engine and the transmission, and serves to shift a mechanical power stream between the output shaft of the internal combustion engine and the input shaft of the transmission, with modulation.

Figure 2:
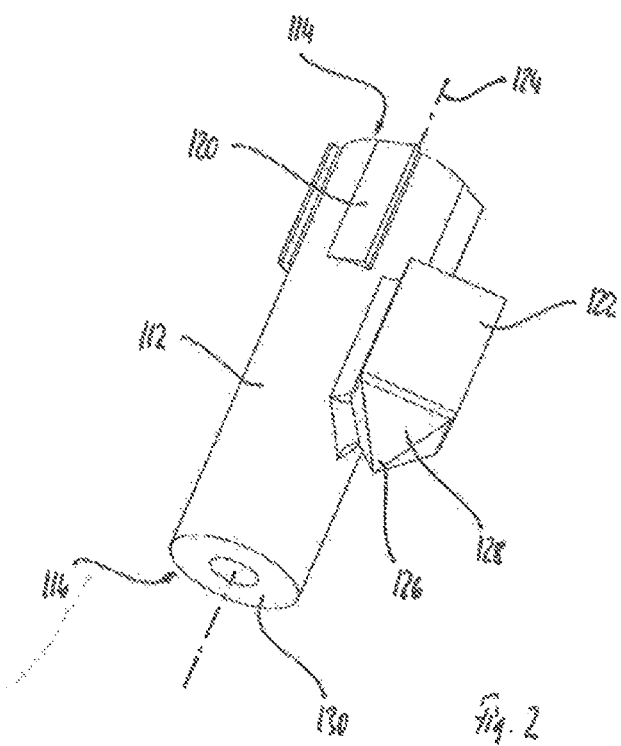
FIG. 2 is a detail view of a tappet of the actuator device.

Actuator device 102 has rotary drive 110, a spindle drive and tappet 112. FIG. 2 shows a detail view of tappet 112 of actuator device 102. Tappet 112 has end 114 on the rotary drive side and opposite end 116. Rotary drive 110 is designed, for example, as an electric motor having a stator and a rotor. The spindle drive is situated at end 114 of tappet 112. The spindle drive has spindle screw 118, and a spindle nut which meshes with spindle screw 118. Spindle screw 118 is drivable with the help of rotary drive 110. The spindle nut is firmly situated on tappet 112.

Rotating spindle screw 118 causes a translational movement of the spindle nut, and therefore of tappet 112, when the spindle nut is prevented from rotating. In this way, tappet 112 is movable between an end position on the rotary drive side and an opposite end position. In the end position on the rotary drive side, the spindle nut bottoms out in the translational direction, so that further rotation of spindle screw 118 and the spindle nut relative to each other is prevented. Rotating spindle screw 118 then also causes a rotational movement of the spindle nut, and thus of tappet 112, without a translational movement.

Tappet 112 has a cylindrical shape. At end 114, tappet 112 has four outward-directed catch tabs, such as 120, protruding radially. Catch tabs 120 serve to engage locking pawls, in order to prevent rotation of tappet 112 and thus of the spindle nut. Tappet 112 has transmission actuating section 122. Transmission actuating section 122 is situated on tappet 112 in the radial direction eccentrically to longitudinal axis 124 of tappet 112. In the axial direction, transmission actuating section 122 is approximately centered on tappet 112. Transmission actuating section 122 is designed in the form of a rectangular bar section, and has a pyramid-shaped point 126. Point 126 of transmission actuating section 122 forms ramp profile 128 with ramps. Transmission actuating section 122 is connected to tappet 112 by one of its edges. Tappet 112 has clutch actuating section 130. Clutch actuating section 130 is formed by end 116 of tappet 112. Clutch actuating section 130 is designed as a thrust bolt.

Perforated mask 104 is firmly situated, for example attached to a transmission housing. Perforated mask 104 has a flat shape. Perforated mask 104 has a clamp-like shape. In the present case, perforated mask 104 has four notch-like cutouts 132, 134, 136, 138. Cutouts 132, 134, 136, 138 are assigned to four gear steps of the transmission. Cutouts 132, 134, 136, 138 each have edge sections which form a guideway for transmission actuating section 122 of tappet 112 as it moves translationally. Between cutouts 132, 134, 136, 138, perforated mask 104 has cutout 140 for tappet 112. Cutouts 132, 134, 136, 138, 140 are each formed by an inside edge of perforated mask 104. Cutout 140 is open toward the outside.

Gear tracks 106, 108 are each connected kinematically to a shifting element of the transmission. Gear tracks 106, 108 are each movable, in order to switch the shifting element to engage and/or disengage a gear step. Gear tracks 106, 108 each have a flat shape. Gear tracks 106, 108 each have a clamp-like shape with two legs. Only gear track 106 will be described below, by way of example. Gear track 106 has notch-like cutouts 142, 144, 146. Cutouts 142, 144, 146 each have edge sections which correspond to ramp profile 128 of transmission actuating section 122 of tappet 112, so as to bring about a movement of gear track 106 when tappet 112 moves translationally. Cutouts 142, 144 serve to disengage a gear step. Cutout 146 serves to engage a gear step. Between cutouts 142, 144, 146 gear track 106 has cutout 148 for tappet 112. Cutouts 142, 144, 146, 148 are each formed by an inside edge of gear track 106. Cutout 148 is open toward the outside. Legs 150, 152 of gear track 106 are offset from each other at different heights. The legs of gear track 108 are offset in opposite directions from each other at different heights. This enables gear tracks 106, 108 to be arranged so that legs 150, 152 of gear track 106 and the legs of gear track 108 mesh with each other in opposite directions.

FIG. 5 shows actuation device 100 after executing a selection movement. FIG. 6 shows actuation device 100 while engaging a gear step. To execute a selection movement, rotary drive 110 with spindle screw 118 is first operated according to arrow direction a, until the spindle nut with tappet 112 bottoms out in the translational direction at the end position on the side of the rotary drive, so that spindle screw 118 and the spindle nut with tappet 112 are prevented from rotating further relative to each other. Rotary drive 110 is then operated further according to arrow direction a, whereupon tappet 112 moves rotationally and transmission actuating section 122 revolves. With the help of catch tab 120 and a locking pawl, after a change of direction of rotation of the rotary drive, tappet 112 is then preset in a desired rotational position so that transmission actuating section 122 is located above desired cutout 132, 134, 136 or 138 of perforated mask 104. Rotary drive 110 is then operated according to arrow direction b. A meshing of a locking pawl with catch tab 120 prevents tappet 112 from rotating, so that tappet 112 moves in the translational direction corresponding to arrow direction c. In the present case, transmission actuating section 122 of tappet 112 dips into cutout 134 of perforated mask 104, whereupon transmission actuating section 122 is guided precisely to the edge sections of cutout 134 as it moves further in arrow direction c. Upon further movement in arrow direction c, transmission actuating section 122 with its ramp profile 128 meshes with corresponding edge sections of cutout 142 of gear track 106 and a cutout beneath it of gear track 108, and displaces gear tracks 106, 108 in such a way that a gear step is disengaged with the help of gear track 106 and a gear step is engaged with the help of gear track 108. Without a change in the direction of rotation of rotary drive 110, a further movement of tappet 112 in arrow direction c occurs, whereupon the tappet 112 actuates the friction clutch using its clutch actuating section 130. The friction clutch is engaged when the tappet 112 moves in arrow direction c, enabling a transfer of power between the internal combustion engine and the transmission using the previously engaged gear step. The friction clutch is preferably an automatically disengaging clutch. To disengage the friction clutch, the friction clutch 110 is then again operated in the opposite rotational direction corresponding to arrow direction a, so that the tappet 112 moves contrary to arrow direction c. To shift a gear step, transmission actuating section 122 is then withdrawn completely out of cutout 134 of perforated mask 104, until tappet 112 hits the stop in the end position on the side of the rotary drive, and a gear step can be selected again by presetting transmission actuating section 122 above a desired cutout 132, 134, 136 or 138.

Figure 7:
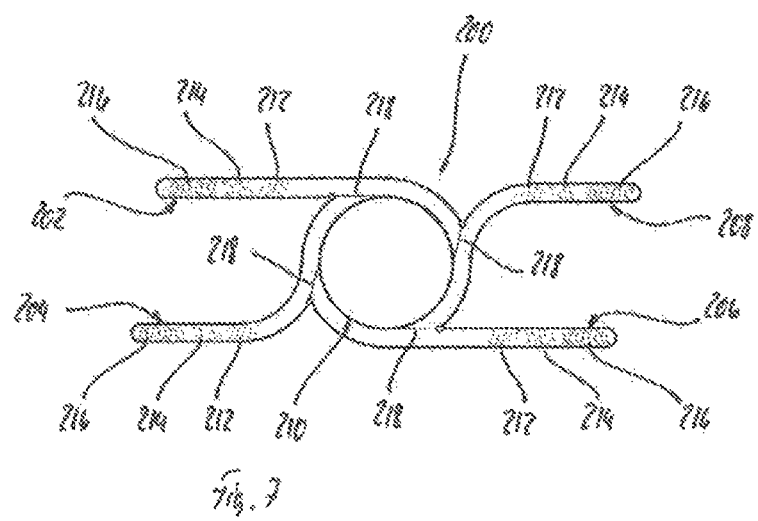
FIG. 7 illustrates a track model for a selection and actuation principle of an actuation device; and, FIG. 8 is a schematic diagram of a dual-clutch transmission having two subtransmissions and two actuation devices.

FIG. 7 shows track model 200 for a selection and actuation principle of an actuation device, such as actuation device 100 according to FIG. 1. Track model 200 names four setting tracks 202, 204, 206, 208 and one selecting track 210. Selecting track 210 forms a closed ring track. Setting tracks 202, 204, 206, 208 each branch off like offshoots from selecting track 210. Shunting switch 218 is assigned to each of setting tracks 202, 204, 206, 208. Track model 200 can be traveled in both directions. In the clockwise direction, selecting track 210 is traveled in a continuous circle. If the travel direction is reversed, subsequent arrival at switch 218 when traveling selecting track 210 counter-clockwise causes diversion onto an associated setting track 202, 204, 206, 208. This setting track 202, 204, 206, 208 is then traversed, starting from selecting track 210 to its end and back again to selecting track 210. Selecting track 210 is then again traveled continuously in the clockwise direction, and by changing the direction of rotation to counter-clockwise a new setting track 202, 204, 206, 208 can be traveled via switch 218.

When one of setting tracks 202, 204, 206, 208 is traveled, first a disengagement zone 212 is traversed, in which a gear step of another track that may have been engaged is disengaged. Engagement zone 214 is then traversed, in which the gear step of setting track 202, 204, 206, 208 being traveled is engaged. Next clutch zone 216 is traversed, in which a friction clutch is actuated.

The four setting tracks 202, 204, 206, 208 correspond to four gear steps of a transmission. Traveling selecting track 210 in the counter-clockwise direction corresponds to a selection movement, comparable to a rotational movement of tappet 112 in arrow direction a. Traveling selecting track 210 in the counter-clockwise direction corresponds to a rotational movement of tappet 112 in arrow direction b. Switches 218 correspond to catch tabs 120 interacting with a locking pawl. Traveling setting track 202, 204, 206, 208 starting from selecting track 210 to its end corresponds to a translational movement of tappet 112 in arrow direction c. For further details please see FIG. 1 through FIG. 6 and the associated description.

Figure 8:
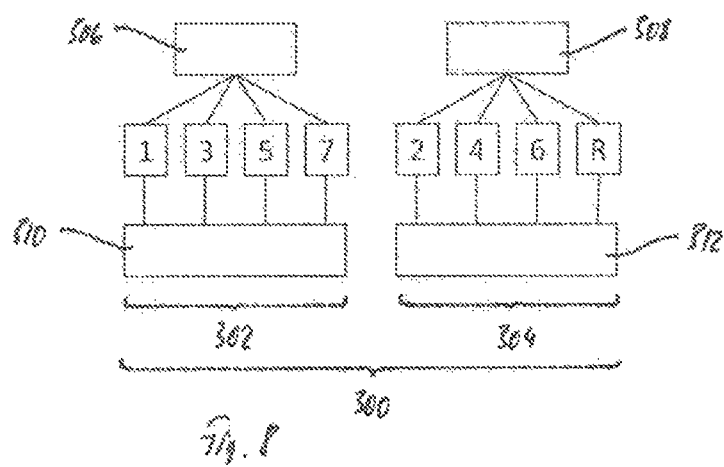

FIG. 8 shows a schematic diagram of dual-clutch transmission 300 having two sub-transmissions 302, 304 and two actuation devices 306, 308, such as actuation device 100. Dual-clutch transmission 300 has seven gear steps 1, 2, 3, 4, 5, 6 and 7 for forward travel, and one gear step R for reverse travel. Subtransmission 302 has gear steps 1, 3, 5 and 7. Subtransmission 304 has gear steps 2, 4, 6 and R. Friction clutch 310 serves to connect subtransmission 302 to an internal combustion engine. Friction clutch 312 serves to connect subtransmission 304 to an internal combustion engine. Actuation device 306 serves to actuate both subtransmission 302 and friction clutch 310. Actuation device 308 serves to actuate both subtransmission 304 and friction clutch 312. For further details please see FIG. 1 through FIG. 7 and the associated description.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

100 Actuation device
102 Actuator device
104 Perforated mask
106 Gear track
108 Gear track
110 Rotary drive
111 Radially outward facing surface
112 Tappet
114 End
116 End
118 Spindle screw
120 Catch tab
122 Transmission actuating section
124 Longitudinal axis
126 Point
128 Ramp profile
130 Clutch actuating section
132 Cutout
134 Cutout
136 Cutout
138 Cutout
140 Cutout
142 Cutout
144 Cutout
146 Cutout
148 Cutout
150 Leg
152 Leg
200 Track model
202 Setting track
204 Setting track
206 Setting track
208 Setting track
210 Selecting track
212 Disengagement zone
214 Engagement zone
216 Clutch zone
218 Shunting switch
300 Dual-clutch transmission
302 Subtransmission
304 Subtransmission
306 Actuation device
308 Actuation device
310 Friction clutch
312 Friction clutch

What is claimed is:

1. An actuation device for a motor vehicle having a transmission with gear steps and a friction clutch, the actuation device comprising:
   an actuator device, including:
      a rotary drive;
      a spindle screw; and,
      a tappet which can be moved rotationally and translationally, the tappet having:
         a first end;
         a second end; and,
         a radially outward facing surface; and,
   a transmission actuating section:
      connected to and extending from the radially outward facing surface; and,
      arranged between the first end and the second end, the transmission actuating section comprising a ramp profile forming a point that is directed in a first axial direction, toward the second end.

2. The actuation device of claim 1, wherein when the transmission is actuated, first a gear step which is to be engaged is selected and then the selected gear step is engaged, wherein a selection movement of the actuator device is executed with a rotational movement and an engagement movement of the actuator device is executed with a translational movement.

3. The actuation device of claim 1, further comprising at least one catch tab arranged on the radially outward facing surface proximate the first end and configured to disengage a gear step, when engaging or shortly before engaging a gear step.

4. The actuation device of claim 2, further comprising at least one catch tab configured to secure an actuation state of the transmission during actuation of the friction clutch.

5. The actuation device of claim 1, wherein, when actuated, the transmission is actuated before the friction clutch.

6. The actuation device of claim 1, wherein the rotary drive, using a continuous drive motion, actuates the transmission and the friction clutch one after the other.

7. The actuation device of claim 1, wherein the second end is a clutch actuating section and the actuation device further comprises a fixed perforated mask and at least one movable gear track.

8. The actuation device of claim 7, wherein the ramp profile is arranged to move the at least one gear track.

* * * * *